US005789831A

United States Patent [19]
Kregling

[11] Patent Number: 5,789,831
[45] Date of Patent: Aug. 4, 1998

[54] METHOD OF FABRICATING A ROTOR FOR A MOTOR AND THE ROTOR PRODUCED THEREBY

[75] Inventor: Karl David Kregling, Seymour, Conn.

[73] Assignee: Sorval Products, L.P., Newtown, Conn.

[21] Appl. No.: 572,920

[22] Filed: Dec. 15, 1995

[51] Int. Cl.$^6$ .................................................. H02K 15/00
[52] U.S. Cl. ........................... 310/42; 310/156; 29/598
[58] Field of Search .......................... 310/156, 42, 261; 29/596, 598

[56] References Cited

U.S. PATENT DOCUMENTS

| | | | |
|---|---|---|---|
| 3,427,483 | 2/1969 | Selitrennikoff | 310/45 |
| 3,483,410 | 12/1969 | Siegelman et al. | 310/114 |
| 4,341,343 | 7/1982 | Beckman | 233/26 |
| 4,433,261 | 2/1984 | Nashiki et al. | 310/156 |
| 4,748,359 | 5/1988 | Yahara et al. | 310/156 |
| 4,973,872 | 11/1990 | Dohogne | 310/156 |
| 5,004,965 | 4/1991 | Otokawa et al. | 318/254 |
| 5,065,063 | 11/1991 | Watanabe | 310/156 |
| 5,069,413 | 12/1991 | Carson et al. | 248/638 |
| 5,093,595 | 3/1992 | Korbel | 310/156 |
| 5,298,826 | 3/1994 | Lee et al. | 310/156 |
| 5,345,130 | 9/1994 | Kliman et al. | 310/156 |

FOREIGN PATENT DOCUMENTS

| | | | |
|---|---|---|---|
| 52-140738 | 11/1977 | Japan | |
| 5-207688 | 1/1992 | Japan | |
| 1636930 A1 | 3/1991 | U.S.S.R. | 310/42 |

*Primary Examiner*—Steven L. Stephan
*Assistant Examiner*—Elvin G. Enad
*Attorney, Agent, or Firm*—Ohlandt, Greeley, Ruggiero & Perle

[57] ABSTRACT

Disclosed is a method for manufacturing a rotor structure for a motor using a square shaft member and four magnet members and the structure produced thereby. The method comprises the steps of:

(a) mounting to each of the lateral surface of the shaft the back surface of one of the four magnets thereby to form a single circumferential layer of magnets about the shaft, the four magnets being mounted such that:

(i) a portion of the back surface of each of the four magnets extends past an edge of the shaft for at least a predetermined distance thereby to define about the circumference of the shaft a total of four overhanging areas; and (ii) one side surface of each of the four magnets abuts against an overhanging area; and (b) thereafter forming the single circumferential layer of the four magnets into a continuous circular contour centered on the axis of the shaft.

2 Claims, 3 Drawing Sheets

5,789,831

1

METHOD OF FABRICATING A ROTOR FOR A MOTOR AND THE ROTOR PRODUCED THEREBY

BACKGROUND OF THE INVENTION

1. Field of Invention

The present invention relates to a method of fabricating the rotor of an electric motor, and to the rotor produced thereby.

2. Description of Prior Art

The rotor of an electric motor comprises a central shaft which carries an array of permanent magnets surrounded by a metallic support sleeve. The exterior of the shaft is generally cylindrical configuration. Presently each of the magnets to be mounted to the shaft is machined and shaped on both its inner and its outer surface prior to its attachment to the shaft. This manufacturing technique places a premium upon accurate dimensioning of the parts during the machining process. Any errors made during the machining of the magnets may result in difficulty in mounting the magnets to the shaft or in the creation of gaps between the magnets and the shaft, between adjacent magnets, or between the magnets and the sleeve. Any of these conditions is seen as disadvantageous.

U.S.S.R. Patent 1,636,930 (Sychev) is directed toward the solution of problems associated with the manufacture of a permanent magnet rotor for a high speed electric motor. This reference discloses the use of a shaft having a generally square cross section onto which at least two layers of preformed magnets are attached. The magnets in the radially inner layer are each generally rectangular in cross section, with the long dimension of the rectangular shape being such that a portion of the back surface of each magnet extends past the edge of the face of the shaft to which it is attached. A side surface on each magnet abuts against the extending portion of a circumferentially adjacent magnet. The magnets in the second, radially outer, layer are attached to the exterior surface of the magnets forming the inner layer. The exterior surface of these magnets is generally cylindrical in configuration. However, the length of the magnets in the second layer is such that circumferential gaps are defined between the side surfaces of circumferentially adjacent magnets.

In view of the foregoing it is believed advantageous to provide a method for manufacturing the rotor of an electric motor which is believed to be more efficient than the method of the prior art, and which produces a rotor in which a continuous circumferential surface is provided with no circumferential gaps being defined between adjacent magnet elements.

SUMMARY OF THE INVENTION

The present invention are directed to a method for manufacturing a rotor structure for a motor and to the particular rotor structures formed thereby. The method of the present invention uses: (i) a shaft member having an axis of elongation extending therethrough and four planar lateral surfaces thereon, the shaft having a square configuration with four edges when viewed in a cross sectional plane perpendicular to the axis; and (ii) four magnet elements each of which has a planar back surface, two planar side surfaces and a front surface. The magnets are preferably formed from selenium cobalt.

The method of the present invention comprises the steps of:

(a) mounting to each of the lateral surface of the shaft the back surface of one of the four magnets thereby to form

2 a single circumferential layer of magnets about the shaft, the four magnets being mounted such that:
  (i) a portion of the back surface of each of the four magnets extends past an edge of the shaft for at least a predetermined distance thereby to define about the circumference of the shaft a total of four overhanging areas; and
  (ii) one side surface of each of the four magnets abuts against an overhanging area; and (b) thereafter forming the single circumferential layer of the four magnets into a continuous circular contour centered on the axis of the shaft.

In practice, it is preferred that the back surface of each of the four magnets has the same predetermined length dimension.

BRIEF DESCRIPTION OF THE DRAWINGS

The invention will be more fully understood from the following detailed description thereof, taken in connection with the accompanying drawings, which form a part of this application and in which.

DETAILED DESCRIPTION OF THE INVENTION

Figure 1A:
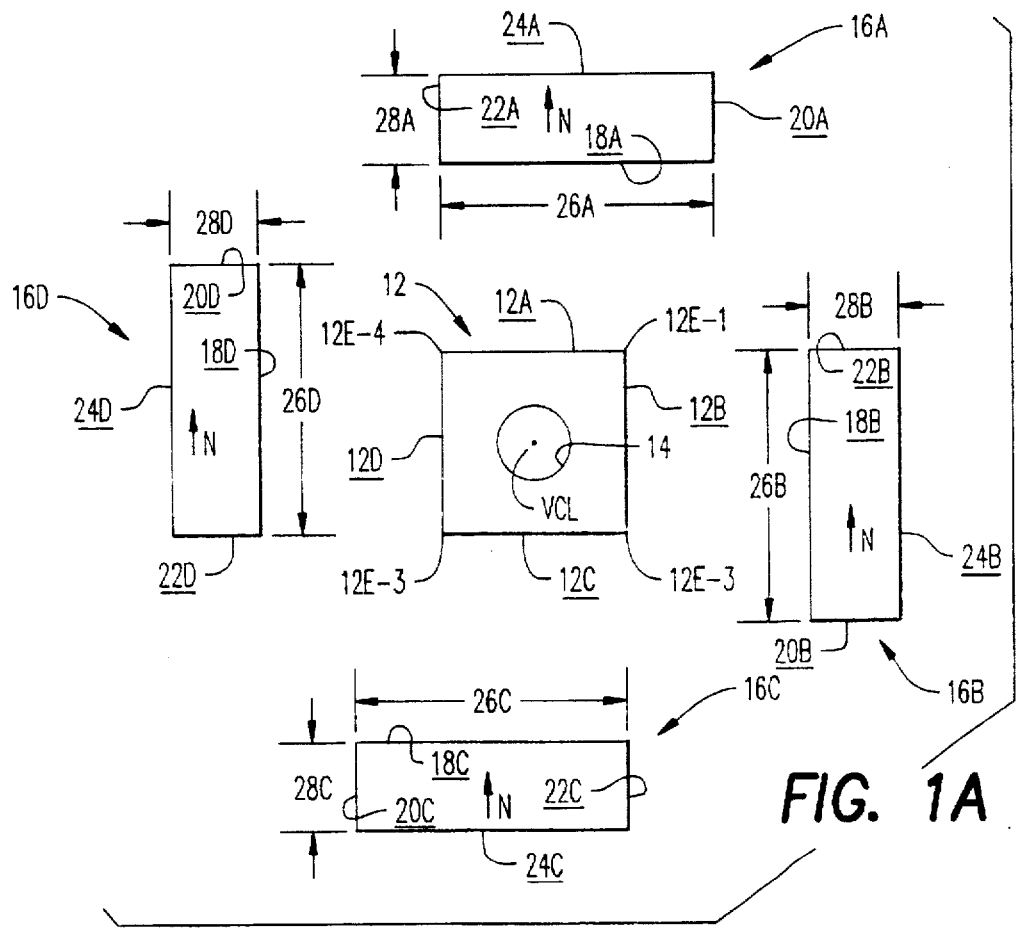
FIGS. 1A through 1F are diagrammatic illustrations of the steps of a method for manufacturing a rotor structure for a motor in accordance with the present invention.
Figure 1B:
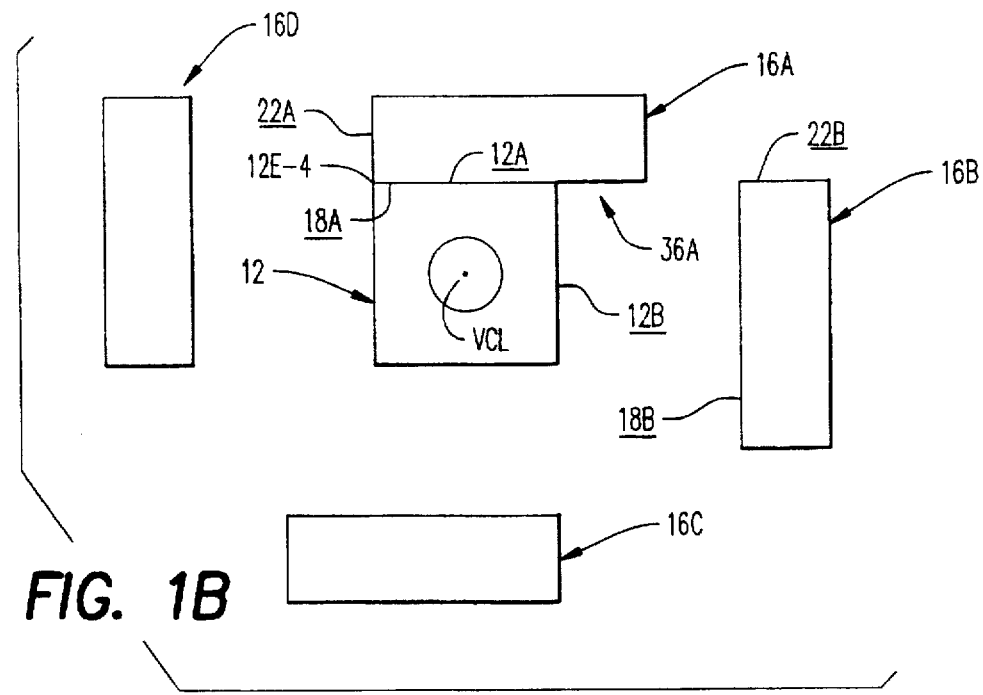
Figure 1C:
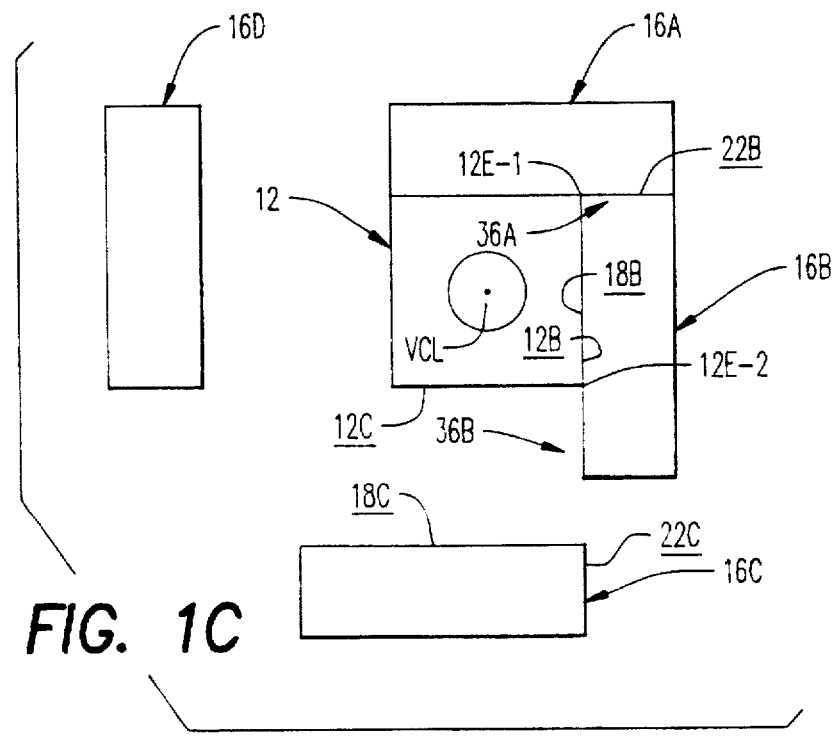
Figure 1D:
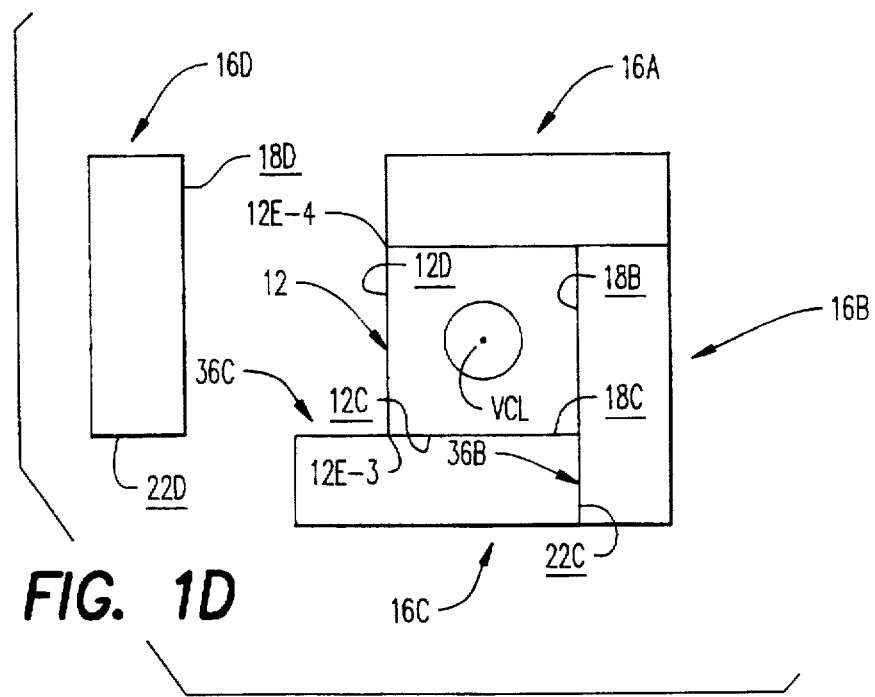

Throughout the following detailed description similar reference numerals refer to similar elements in all Figures of the drawings.

The present invention is directed to a method for manufacturing a rotor structure for an electric motor. The rotor structure produced in accordance with the invention is generally indicated by the reference character 10 (FIG. 1F). The rotor 10 includes a shaft member 12 having an axis of elongation VCL extending therethrough. The shaft 12 has a square configuration when viewed in a cross sectional plane perpendicular to the axis VCL, that is, in the plane of Figures. The four planar lateral surfaces of the shaft 12 are indicated by the reference characters 12A through 12D. The intersections of adjacent ones of the surfaces 12A through 12D define four generally axially extending edges which are indicated by the reference character 12E-1, 12E-2, 12E-3, 12E-4 herein. The surfaces 12A through 12D are to be square within 0.0001 inch per side and are to be flat within 0.0001 inch per side. If desired the shaft member 12 may have a central axial bore 14 extending therethrough.

In accordance with the present invention four magnet elements, indicated by the reference characters 16A through 16D, are disposed to form a single circumferential layer of magnets about the shaft 12. The preferred material used to form the magnets 16A through 16D is selenium cobalt.

As shown in FIG. 1A each of the four magnet members 16A through 16D has a planar back surface (indicated in the drawings by the reference characters 18A through 18D, respectively), a first planar side surface (indicated in the drawings by the reference characters 20A through 20D, respectively), a second planar side surface (indicated in the drawings by the reference characters 22A through 22D, respectively), and a front surface (indicated in the drawings by the reference characters 24A through 24D, respectively). The length dimension of each of the magnets is indicated by the dimension lines 26A through 26D, while the width dimension of each of the magnets is indicated by the dimension lines 28A through 28D. The back surfaces 18A through 18D and the side surfaces 22A through 22D are to be square within 0.0001 inch per side and these surfaces are to be flat within 0.0001 inch per side.

FIGS. 1A through 1F illustrate, in diagrammatic form, the steps in fabricating a rotor in accordance with the present invention. The magnets 16A through 16D are shown arrayed about the periphery of the shaft 12, with the north polar orientation of the magnets being aligned in the same direction. It is preferred that the length dimension 26A through 26D of the magnets (or, at least the length dimension of the back surface 18A through 18D of the magnets 16A through 16D) are substantially equal.

As indicated in FIGS. 1B through 1E the back surface 18A through 18D each of the respective magnets 16A through 16D is mounted to a respective one of the lateral surfaces 12A through 12D of the shaft 12. The mounting may be effected using a suitable high temperature adhesive. Any high temperature epoxy adhesive may be used.

The magnets are mounted to the surfaces of the shaft 12 such that one of the side surfaces (e. g., the side surface 22A through 22D of each respective magnet 16A through 16D) aligns substantially flush with an edge 12E-1 through 12E-4 of the shaft 12, as the case may be. The sequence in which the magnets 16A to 16D are mounted to a surface of the shaft 12 is not critical, although an orderly sequence of mounting as suggested in FIGS. 1B through 1E is preferred. Each of the four magnets 16A through 16D is mounted such that a portion 36A through 36D of the back surface 18A through 18D of each respective magnet 16A through 16D extends past an edge 12E-1 through 12E-4 of the shaft 12 for at least the predetermined distance 32A through 32D (FIGS. 1B through 1E, respectively), thereby to define the four overhanging areas 36A through 36D (FIGS. 1B through 1E, respectively). In addition, in accordance with the invention one side surface (e. g., the surface 22A through 22D) of each of the respective four magnets 16A through 16D abuts against a respective overhanging area 36A through 36D of another magnet.

Figure 1E:
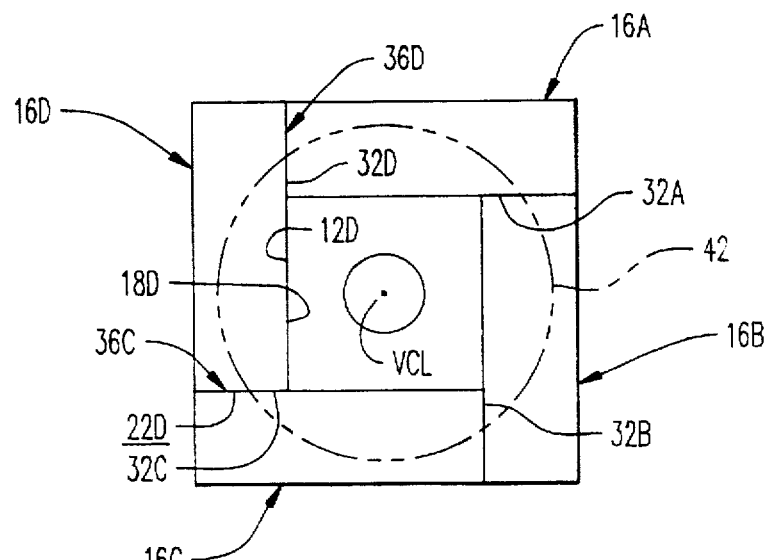
Figure 1F:
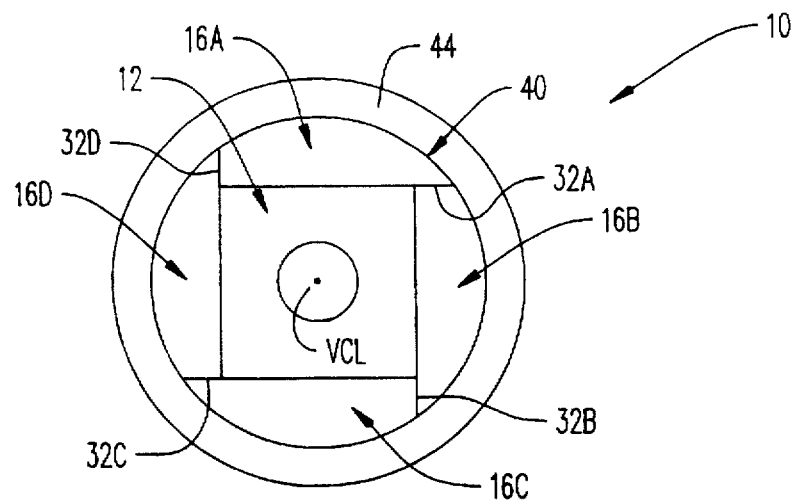

After the four magnets are mounted in a single layer to the surfaces of the shaft the four magnets are formed, as by machining, into a continuous circular contour 40 (FIG. 1F) centered on the axis VCL of the shaft 12. In FIG. 1E the outline of the final contour is indicated in dashed lines 42. The predetermined distance 32A through 32D (FIGS. 1B through 1E) by which the magnets 16A through 16D extend past the edges of the shaft surfaces must be selected such that there exists a sufficient degree of overlap between adjacent magnets 16A through 16D so that the continuous circular contour 40 may be formed without circumferential gaps being defined between adjacent magnets. The exterior surface of the magnets 16A through 16D should be machined to a tolerance of 0.001 inch.

After the magnets are machined to form the continuous circumferentially contour a sleeve 44 (FIG. 1F) may be shrink fit or otherwise suitably mounted over the magnets 16A through 16D.

It may be appreciated from the foregoing that the present invention defines a method for fabricating a rotor for a motor in which the preforming of the magnets and the associated dimensional criticality is eliminated. Moreover, by using a single layer of magnets and overlapping the magnets in the manner described, the exterior surface of the magnets in the layer may a continuous circumferential contour.

Those skilled in the art, having the benefit of the teachings of the present invention as hereinbefore set forth may effect various modifications thereto. Such modifications are to be construed as lying within the contemplation of the present invention as set forth in the appended claims. For example, although the magnets 16A through 16D are illustrated having the same polar orientation, it should be understood that such need not be the case. The polar orientation of some magnets may differ depending on the type of motor in which the rotor is to be used.

What is claimed is:

1. A method for manufacturing a rotor structure for a motor using a shaft member having an axis of elongation extending therethrough and having four planar lateral surfaces thereon, the shaft having a square configuration with four edges when viewed in a cross sectional plane perpendicular to the axis, and four magnet members each of which has a planar back surface, two planar side surfaces and a front surface, the method comprising the steps of:

(a) mounting to each of the lateral surface of the shaft the back surface of one of the four magnets thereby to form a single circumferential layer of magnets about the shaft, the four magnets being mounted such that:

(i) a portion of the back surface of each of the four magnets extends past an edge of the shaft for at least a predetermined distance thereby to define about the circumference of the shaft a total of four overhanging areas; and (ii) one side surface of each of the four magnets abuts against an overhanging area; and (b) thereafter forming the single circumferential layer of the four magnets into a continuous circular contour centered on the axis of the shaft by machining away a portion of each of the four magnets.

2. The method of claim 1 wherein the back surfaces of each of the four magnets are equal.

* * * * *